US012522172B2

(12) United States Patent
George et al.

(10) Patent No.: US 12,522,172 B2
(45) Date of Patent: Jan. 13, 2026

(54) METHOD AND SYSTEM FOR SEAT BELT STATUS DETECTION (71) Applicant: Aptiv Technologies AG, Schaffhausen (CH)

(72) Inventors: Amil George, Wuppertal (DE); Timo Rehfeld, Cologne (DE); Alexander Barth, Wermelskirchen (DE)

(73) Assignee: Aptiv Technologies AG, Schaffhausen (CH)

( * ) Notice: Subject to any disclaimer, the term of this patent is extended or adjusted under 35 U.S.C. 154(b) by 432 days.

(21) Appl. No.: 18/051,229

(22) Filed: Oct. 31, 2022

(65) Prior Publication Data
US 2023/0166687 A1 Jun. 1, 2023

(30) Foreign Application Priority Data

Nov. 26, 2021 (EP) .................................... 21210718

(51) Int. Cl.
*B60R 22/48* (2006.01)
*G06V 10/22* (2022.01)
(Continued)

(52) U.S. Cl.
CPC .............. *B60R 22/48* (2013.01); *G06V 10/22* (2022.01); *G06V 10/764* (2022.01);
(Continued)

(58) Field of Classification Search
CPC ............ B60R 22/48; B60R 2022/4808; B60R 2022/4866; G06V 10/22; G06V 10/764;
(Continued)

(56) References Cited

U.S. PATENT DOCUMENTS

| 8,036,795 B2 | 10/2011 | Allen |
| 10,611,335 B2 | 4/2020 | Cech et al. |

(Continued)

FOREIGN PATENT DOCUMENTS

| CN | 110084184 | 8/2019 |
| CN | 110458093 | 11/2019 |

(Continued)

OTHER PUBLICATIONS

Baltaxe, Michael, et al. "Marker-less vision-based detection of improper seat belt routing." 2019 IEEE intelligent vehicles symposium (IV). IEEE, 2019. (Year: 2019).*

(Continued)

*Primary Examiner* — Gregory A Morse
(74) *Attorney, Agent, or Firm* — Harness, Dickey & Pierce, P.L.C.

(57) ABSTRACT

Systems and methods for seat belt status detection in a vehicle are provided and include: obtaining first infrared images and second visible light spectrum images of a seat belt region where a seat belt is expected to be visible when it is worn by a person in a vehicle; performing image analysis to extract information from the images attributing a score to each of the images based on the information extracted from the images and based on a predefined rule, each score indicating trustworthiness of the image to detect a seat belt status; transmitting the images to classifiers; determining estimates of probability that the images include the seat belt being correctly worn; combining the estimates of probability, based on the scores, to determine a combined probability; and comparing the combined probability to a predetermined threshold to determine the seat belt status.

15 Claims, 5 Drawing Sheets

(51) Int. Cl.
*G06V 10/764* (2022.01)
*G06V 10/80* (2022.01)
*G06V 20/59* (2022.01)
*G06V 40/10* (2022.01)

(52) U.S. Cl.
CPC ............ *G06V 10/811* (2022.01); *G06V 20/59* (2022.01); *G06V 40/10* (2022.01); *B60R 2022/4808* (2013.01); *B60R 2022/4866* (2013.01)

(58) Field of Classification Search
CPC ...... G06V 10/811; G06V 20/59; G06V 40/10; G06V 20/593; G06V 10/82
See application file for complete search history.

(56) References Cited

U.S. PATENT DOCUMENTS

| | | | |
|---|---|---|---|
| 11,046,273 B2* | 6/2021 | Baltaxe | ............... G06F 18/24 |
| 2007/0195990 A1 | 8/2007 | Levy | |
| 2008/0036580 A1 | 2/2008 | Breed | |
| 2010/0087990 A1 | 4/2010 | Allen et al. | |
| 2016/0078306 A1* | 3/2016 | Artan | ............... G06V 10/764 |
| | | | 382/104 |
| 2018/0326944 A1 | 11/2018 | Cech et al. | |
| 2021/0008958 A1 | 1/2021 | Porta | |
| 2021/0206344 A1* | 7/2021 | George | ............. B60R 21/01544 |
| 2022/0101066 A1* | 3/2022 | Bondugula | ............. G06V 10/82 |

FOREIGN PATENT DOCUMENTS

| | | | | |
|---|---|---|---|---|
| CN | 110503831 A | * | 11/2019 | ......... G06K 9/00724 |
| EP | 3848257 | | 7/2021 | |
| KR | 20210128532 A | * | 10/2021 | ............... G06T 7/90 |
| WO | 2020165908 | | 8/2020 | |
| WO | WO-2020165908 A2 | * | 8/2020 | ........ B60W 50/0098 |

OTHER PUBLICATIONS

APA Dictionary of Psycology accessed Jun. 29, 2025 (Year: 2025).*
Reliability definition, Cambridge English Dictionary accessed Jun. 29, 2025 (Year: 2025).*
"Extended European Search Report", EP Application No. 21210718. 9, May 18, 2022, 10 pages.
Balci, et al., "NIR Camera Based Mobile Seat Belt Enforcement System Using Deep Learning Techniques", 14th International Conference on Signal-Image Technology & Internet-Based Systems {SITIS}, 2018, Nov. 2018, 6 pages.
Elihos, et al., "Comparison of Image Classification and Object Detection for Passenger Seat Belt Violation Detection Using NIR & RGB Surveillance Camera Images", Nov. 2018, 6 pages.
Kashevnik, et al., "Seat Belt Fastness Detection Based on Image Analysis from Vehicle In-$abin Camera", 2020 26th Conference on Open Innovations Association (FRUCT), Apr. 2020, 8 pages.
Yi, et al., "Safety Belt Wearing Detection Algorithm Based on Human Joint Points", 2021 IEEE International Conference on Consumer Electronics and Computer Engineering (ICCECE), Jan. 2021, 4 pages.
Zhou, "Learning-based seat belt detection in image using salient gradient", Jun. 2017, 4 pages.

* cited by examiner

METHOD AND SYSTEM FOR SEAT BELT STATUS DETECTION

INCORPORATION BY REFERENCE

This application claims priority to European Patent Application Number 21210718.9, filed on Nov. 26, 2021, the disclosure of which is incorporated by reference in its entirety.

BACKGROUND

Most vehicles are equipped with a system for automatically detecting whether or not an occupant of the vehicle is wearing a seat belt.

For that purpose, it is well known to use a seat belt buckle sensor, installed in a buckle receiver, that detects if a seat belt buckle has been plugged in. Another type of sensor measures how much the seat belt is pulled out to determine whether the seat belt is worn by a person.

Such sensors are reliable and low costs, but they are limited in that they may not identify some misuse of the seat belt. For example, the sensor may fail to detect that an occupant has buckled his seat belt by plugging the seat belt buckle in the buckle receiver of a neighboring seat, or that the seat belt is not correctly worn by the person. For example, the seat belt may be misplaced behind the body, or below the shoulder and arm.

The automotive manufacturers and suppliers are currently developing image-based systems for seat belt status detection. Such detection system generally includes an image sensor that collects images of a seat belt region, where a seat belt is expected to be visible when it is worn by an occupant of the vehicle, and a processor that analyzes the images to determine a seat belt status.

US 2007/0195990 A1 discloses an image-based seat belt status detection system for a vehicle. A plurality of reflective indicators is distributed over a seat belt assembly, and an infrared light source illuminates the seat belt assembly. An image sensor receives the reflected infrared light from the plurality of reflective indicators and captures an image. Then, an image processor analyzes the captured image, identifies the plurality of indicators, and matches the identified indicators to a predefined set of indicators to characterize a seat belt status as "belted" or "unbelted".

US 2010/0087990 A1 discloses an image-based occupant classification system for determining occupant classification and seat belt status. The system has an image sensor that captures for example infrared or near-infrared images, and an image processor that analyzes images captured by the image sensor so as to determine a status of a seat belt by detecting whether a portion of a seat belt is placed across the front of an occupant, or whether a tongued portion of a seat belt is engaged with an associated buckle.

US 2018/0326944 A1 discloses another system for detection and monitoring of an occupant seat belt. The system includes a light source emitting a predetermined wavelength of light onto a seat belt assembly comprising a reflective pattern that reflects the predetermined wavelength at a preferred luminance, a 3D time-of-flight camera that captures images of the seat belt assembly, and a computer processor that calculates a depth measurement of the distance of the reflective pattern on the seat belt assembly from the images.

CN110084184A discloses another image-based seat belt status detection system. The system includes a wide-angle camera, and a processor provided with an image judgment module including a face feature recognition block, a shoulder feature recognition block, and a seat belt feature recognition block. In operation, the wide-angle camera collects images of the seat belt state. When the brightness is insufficient, an infrared emitting source is used and infrared images are collected. The image module judgment processes the collected images, extracts face features and shoulder features, computes the distance of right shoulder to a central line of the face and the distance of left shoulder to the central line of the face, and compares the two shoulder distances to make a preliminary judgment of whether the seat belt is worn. More precisely, the shoulder distance on the side of the seat belt should be shorter than the shoulder distance on the side without seat belt, when the seat belt is worn by an occupant. When the seat belt is initially determined to be worn, characteristics points of the seat belt are fitted to a straight line and different characteristics of the straight line, for example slope, length, etc., are compared to a threshold range to determine if the seat belt is correctly worn.

CN110458093A discloses a seat belt status detection method based on a driver monitoring system (DMS). After obtaining a target DMS image, an angle value of a first part of the seat belt, extending from an uppermost end of the seat belt to the driver's shoulder, is determined from the target DMS image and compared to an angle threshold to determine if the driver is correctly wearing the seat belt. A second part of the seat belt, extending from the driver's shoulder to the lowermost end of the seat belt, may also be identified, and transmitted to a trained classifier for recognition. The classification result allows to determine whether the driver correctly wears his seat belt. The image may be an infrared image.

A main drawback of the known seat belt status detection systems is that, depending on the current conditions in the cabin, such as luminosity, color of the occupant's clothes, color of the seat belt, etc., the detection result may be erroneous.

Therefore, there is a need for improving the reliability of the seat belt status detection based on images, and avoid false positive detections as far as possible.

SUMMARY

The present disclosure concerns a computer-implemented method for seat belt status detection in a vehicle, comprising the execution, by a processing device, of the following steps: obtaining, from an image capturing device, at least one first image in the infrared spectrum of at least part of a seat belt region where a seat belt is expected to be visible when it is worn by a person in the vehicle; obtaining, from the image capturing device, at least one second image in the visible light spectrum of at least part of the seat belt region used to obtain the at least one first image; transmitting the at least one first image to a first classifier, dedicated for images in the infrared spectrum; transmitting the at least one second image to a second classifier, dedicated for images in the visible light spectrum, determining from the first classifier a first estimate of probability that the at least one first image includes a seat belt correctly worn; determining from the second classifier a second estimate of probability that the at least one second image includes a seat belt correctly worn; combining the first estimate of probability and the second estimate of probability, using respective scores attributed to the at least one first image and to the at least one second image, each score being indicative of the trustworthiness of the corresponding image to detect a seat belt status, to determine a combined probability; comparing the combined probability to a predetermined threshold to determine a seat belt status.

The above defined method allows to dynamically decide based on images and depending on current conditions in the vehicle, whether the seat belt is correctly worn or not. The fusion or combination of the estimates of probability obtained from images in IR and in visible light allows to dynamically decide which modality, IR or visible light, to trust more in the current situation, and consequently to obtain a seat belt status detection that is robust and reliable, whatever the current environmental conditions, such as time of day, weather, clothing color, luminosity, etc. The quantity of false positive detections may be significantly reduced.

Other features of the present method are defined in the appended claims.

The present disclosure also concerns: a seat belt status detection system for a vehicle, a computer program comprising instructions to cause the system above defined to execute the steps of the method previously defined; a computer-readable medium having stored thereon the computer program; a vehicle including the seat belt status detection system above defined, as defined in the appended claims.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
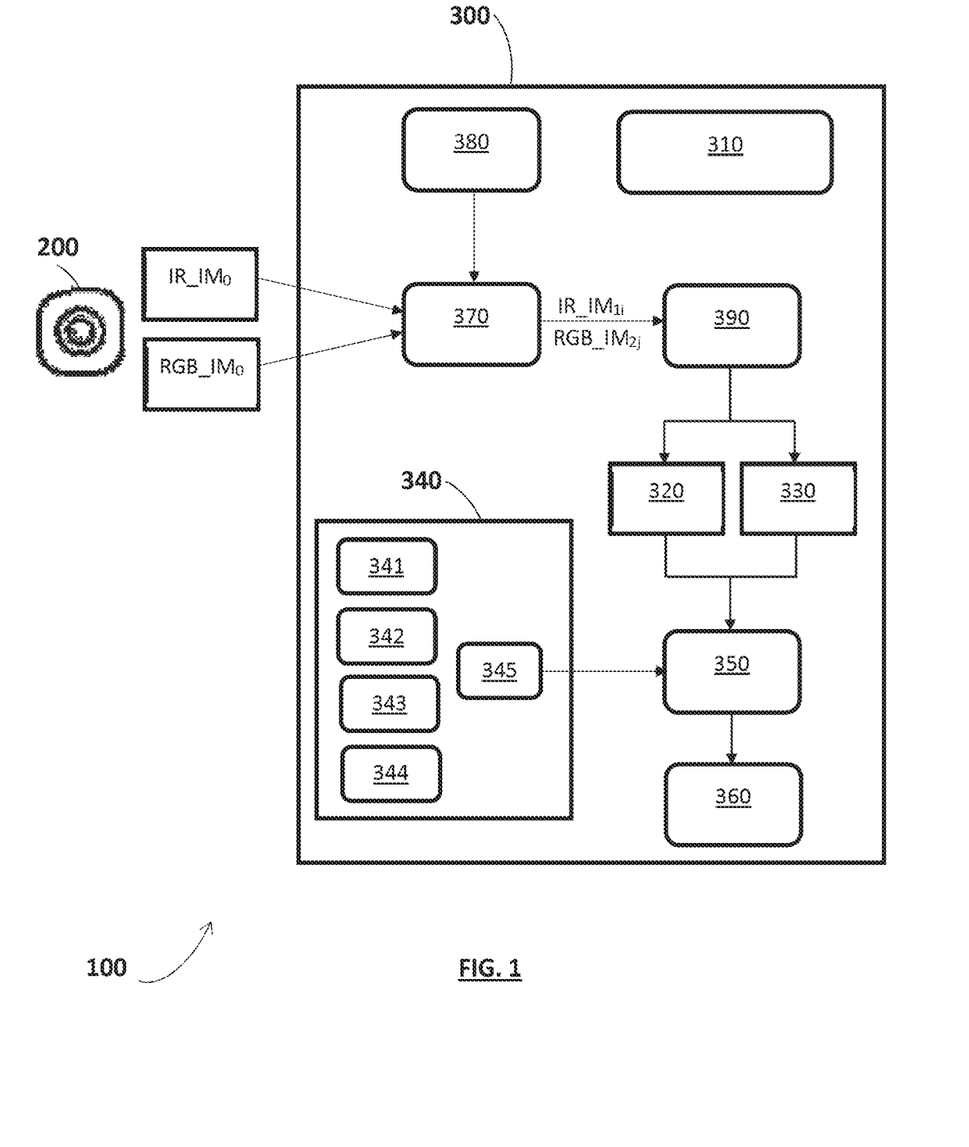
FIG. 1 shows an image-based seat belt status detection system, according to an embodiment.

The present disclosure relates to techniques and apparatuses for seat belt status detection in a vehicle. FIG. 1 illustrates an image-based seat belt status detection system 100, according to an embodiment. The system 100 includes an image capturing device 200 and a processing device 300.

Figure 3:
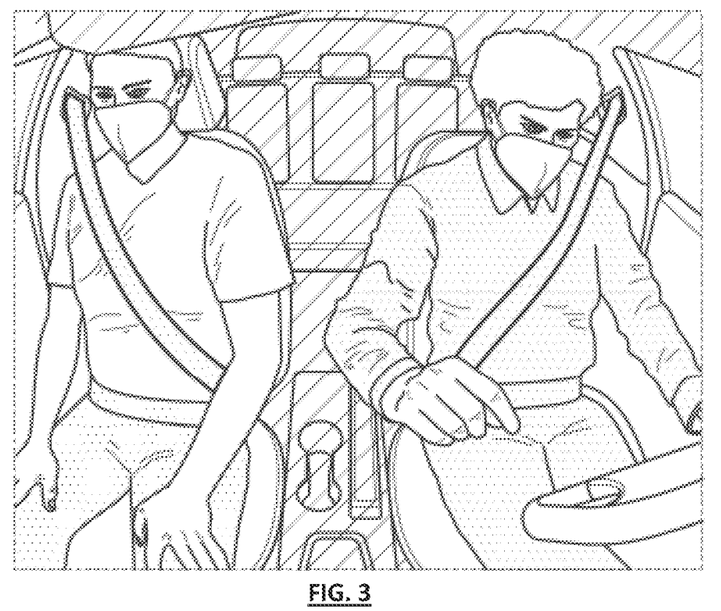
FIG. 3 represents an infrared image corresponding to a front view of the interior of a vehicle, representing a scene including a driver and a passenger seated on the two front seats of the vehicle.
Figure 4:
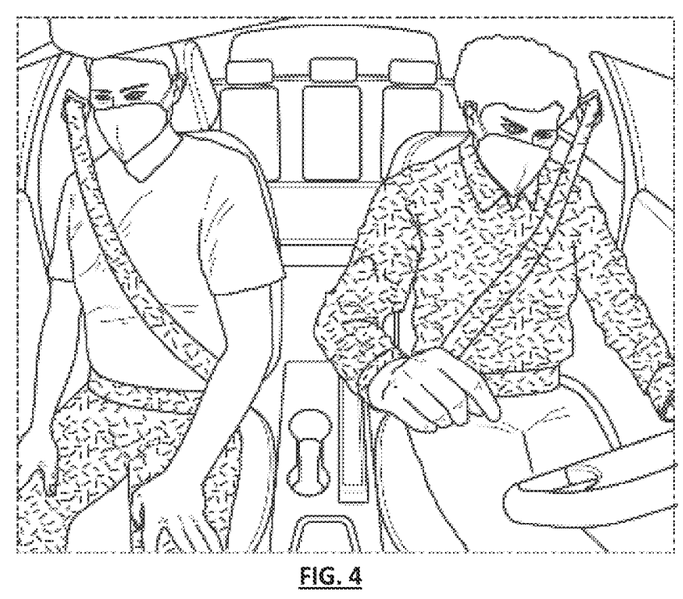
FIG. 4 represents an image of the same scene as the one represented in FIG. 3 but in visible light, for example an RGB or color image.
Figure 5:
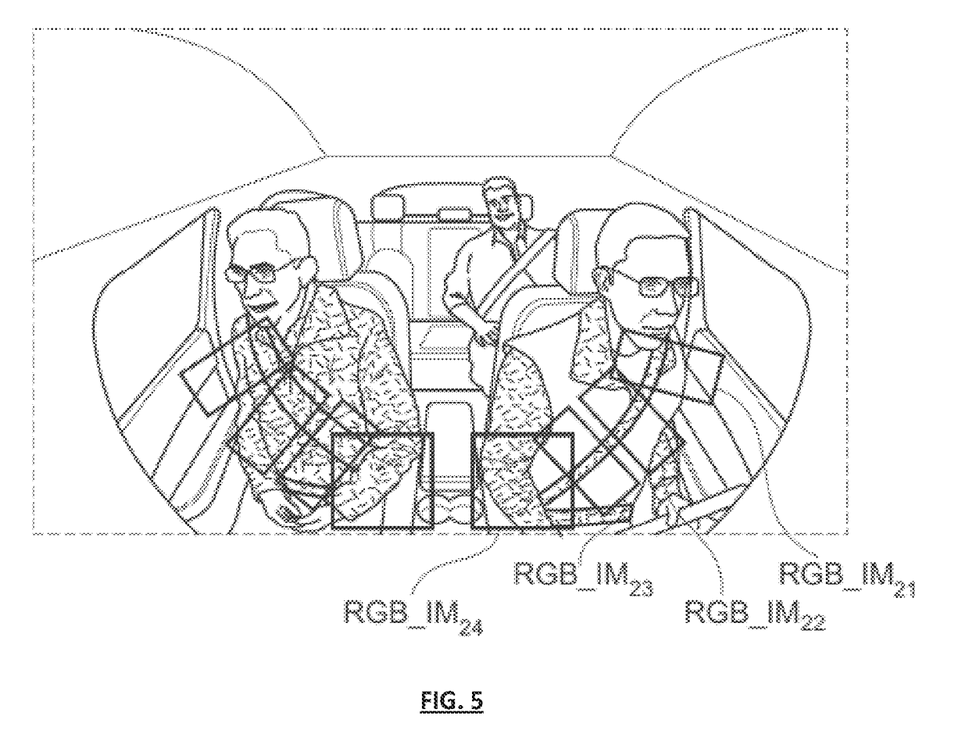
FIG. 5 represents another visible light, RGB or color, image of the interior of a vehicle, including three occupants—two occupants on the front seats and one occupant on a rear seat—and boxes that delimit cropped images of seat belt regions, generated from the visible light image according to an embodiment.

The image capturing device 200 is operable for capturing images in the infrared (IR) part and/or in the near-infrared (NIR) part of the electromagnetic spectrum, for example wavelengths between 750 nm to 1000 nm, and images in the visible light part of the electromagnetic spectrum, for example wavelengths between 380 nm and 750 nm. In an embodiment, the image capturing device 200 may have four spectral channels for red, green, blue and IR and/or NIR wavelengths. For example, the image capturing device 200 is an RGB-IR camera. Two images of a same scene, respectively in IR and in visible light or color, may be captured simultaneously by the device 200 at a given point in time. When one or more occupants are in the vehicle, the captured images include one or more seat belt regions, each seat belt region being an area where a seat belt is expected to be visible when it is worn by an occupant in the vehicle. For example, the images captured by the capturing device 200 correspond to a front view of the vehicle interior including the two front seats and part of the rear seats, as illustrated in FIGS. 3 to 5. FIGS. 3 and 4 illustrate images of the same scene captured in the infrared spectrum and in the visible light spectrum. FIG. 5 illustrates an image of another scene captured in the vehicle in the visible light spectrum.

In the following description, the images captured in the infrared or near-infrared spectrum will be termed as "IR images", and the images captured in the visible light spectrum will be termed as "RGB images" or "color images". But the present disclosure is not limited to IR and RGB.

The processing device 300 has the function of receiving and processing initial images from the image capturing device 200 and, based on the received initial images, detecting whether an occupant of the vehicle is correctly wearing a seat belt, in other words detecting a seat belt status.

The processing device 300 may include a processor 310, a first classifier 320, a second classifier 330, a ranking module 340, a fusion module 350, and a seat belt status detection module 360. The two classifiers 320, 330, the ranking module 340, the fusion module 350 and the seat belt status detection module 360 may be implemented by software or computer programs running on the processor 310.

The two classifiers 320, 330 may have a function of seat belt recognition in an image, for determining whether a seat belt is present or visible in an image, and/or a function of identifying different cases of seat belt misuse in an image, for detecting whether a seat belt is misused, not correctly worn, in the image. The classifiers 320, 330 may be two separate modules 320, 330, one for the IR and/or NIR channel and the other one for the visible light channel, for example a RGB channel. The first classifier 320 is dedicated for processing IR and/or NIR images, and the second classifier 330 is dedicated for processing the RGB or color images. In operation, each classifier 320, 330 receives an image as an input and may determine an estimate of probability that the image includes a seat belt correctly worn.

The two classifiers 320, 330 may be neural networks trained for seat belt recognition and/or for identification of different cases of seatbelt misuse in an image. In that case, the first classifier 320 is trained with infrared images and the second classifier 330 is trained with RGB or color images.

In another embodiment, the classifiers 320, 330 may implement another algorithm suited for classification problems, such as support vector machines (SVM), randomized decision forests, etc.

The ranking module 340 has the function of attributing scores to images. The score attributed to each image is indicative of the trustworthiness of the corresponding image to detect a seat belt status. It represents how the image is trustworthy, or relevant, to detect a seat belt status. A main purpose of the ranking module 340 is to analyze different aspects of an image, that are relevant for determining whether the content in the image is likely to help in determining a seat belt status. In an embodiment, the process of attributing a score to an image may be based on analysis of information in image. The analysis of information in image allows to extract from an image information that is useful to evaluate how the image is trustworthy to detect the seat belt and/or the seat belt status. The ranking module 340 may include one or more functional blocks operable for performing different tasks of analysis of information in the image, such as: a block 341 for analyzing statistical properties of the image, such as brightness, contrast, . . . ; a block 342 for occlusion detection, that detects that vision of the seat belt is occluded in the image, for example by an arm; a block 343 of seat belt color profile recognition, that recognizes a predetermined profile of the seat belt color in the image; a block 344 of clothing detection that detects clothing occluding a back area in the image.

The ranking module 340 could include other functional blocks for implementing other types of tasks of analysis of information in images and/or optionally in the vehicle environment. The analysis of information in the environment allows to determine current environmental conditions like luminosity, weather conditions, time of day, etc.

The ranking module 340 may further include a scoring block 345 that receives, for each image to be scored, image analysis results from the functional blocks 341-344, and computes a score to be attributed to the image, based on predefined rules. The score attributed to each image may correspond to a weighting factor, as explained later. The scores of images are transmitted to the fusion module 350.

The fusion module 350 has the function of combining or fusing estimates of probability of a plurality of images, that are determined by the first classifier 320 and second classifier 330, to compute a combined probability, as will be explained later in more detail. The combined probability may then be transmitted by the fusion module 350 to the seat belt status detection module 360.

The seat belt status detection module 360 is responsible for comparing the combined probability to a predetermined detection threshold, to detect a status of the seat belt, indicating whether the seat belt is correctly worn by the occupant of the vehicle or not.

In an embodiment, the system 100 may further include an image generator 370 operable for: generating a plurality of first images, such as IR or NIR images, that may be termed as sub-images, respectively corresponding to different parts of a seat belt region, from an initial IR image from the image capturing device 200; generating a plurality of second images, such as visible light images or RGB images or color images, that may be termed as sub-images, respectively corresponding to different parts of the seat belt region, from an initial RGB or color image from the image capturing device 200.

The first images and second images may be cropped images from the initial IR image and the initial visible light image, respectively. For example, the first images and second images are delimited by bounding boxes, for example of rectangular shape, as illustrated in FIG. 5. The initial images from the capturing device 200 may be front wide-angle images of the interior of the vehicle showing for example the two front seats and partially the rear seats of the vehicle. FIG. 5 illustrates an initial visible light image and, for each of two occupants seated in front seats, N sub-images or second images, with N=4, cropped from the initial image. The number of first images generated from the initial IR image and the number of second images generated from the color image may be the same. But, they could be different. The sub-images from an initial image may partially overlap.

The system 100 may further include a body key points detection module 380 for detecting and locating body key points for one or more occupants of the vehicle visible in an image. The body key points may include one or more points for left and right shoulders, hip, elbow, hands, and/or face of the occupant. The detected body key points are intended to be used by the generator 370 to identify and locate one or more seat belt regions, where a seat belt is expected to be visible when it is worn by an occupant in the vehicle in the image. For example, a seat belt region may be defined by an area around a line, possibly curved, extending from a given shoulder point—left or right depending on the seat—to an opposite hip point of an occupant.

The system 100 may further include a module 390 for selection of images among all the first IR images and second RGB or color images produced by the generator 370 respectively from one initial IR image and one initial RGB image, both captured simultaneously or approximately simultaneously. The task of the selection module 390 is to determine which images from the first IR images are to be transmitted to the first classifier 320, and which images from the second RGB images are to be transmitted to the second classifier 330. A purpose of the image selection is to limit the computational efforts required for seat belt status detection, as only the selected images are passed to the classifiers 320, 330 for classification. The image selection allows to save computational resources, since the tasks performed by the classifiers are only executed on the selected images, and not on images that are not selected.

In one instance of the detection process or algorithm, the selection module 390 might determine that all first and second images may be transmitted to the corresponding first classifier and second classifier in case the computational budget allows it, in other words in case the available computational resources are sufficient. In another instance of the process, the selection module 390 might ignore, not select, one or more particular images, IR image(s) and/or color image(s), with the lowest scores provided by the ranking module 340, or with scores under a predetermined critical threshold. Low scores may indicate that the corresponding images are not trustworthy for seat belt status detection, for example because the location of the image or sub-image in the initial image or the modality of the image, IR or RGB, is not informative for detecting the seat belt status at a current point in time.

The generator 370, the module for body key points detection 380, and the module 390 for image selection may be implemented by software or computer programs running on the processor 310.

Figure 2A:
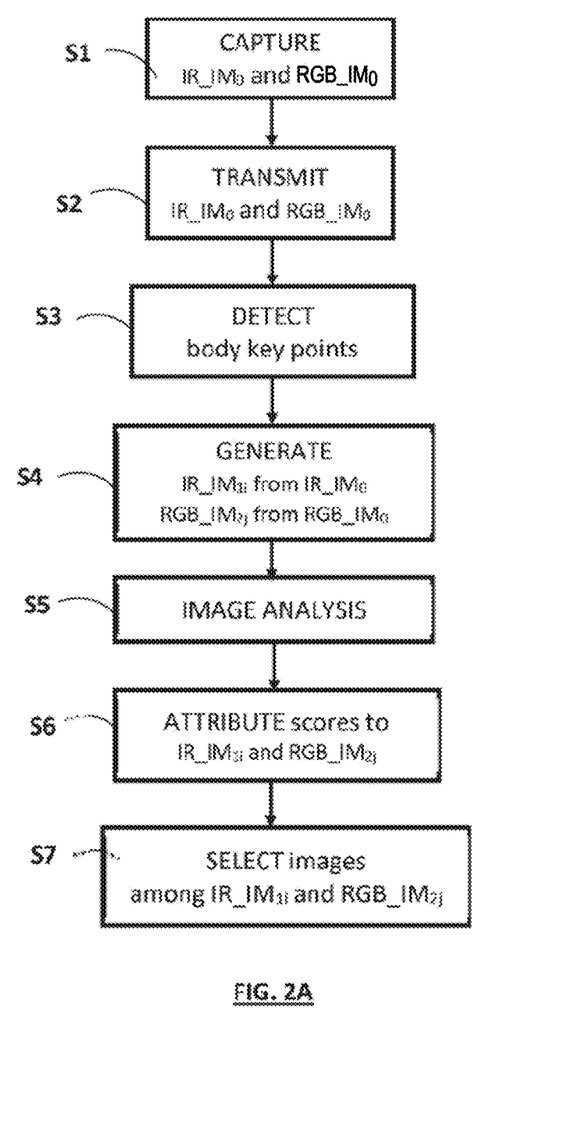
FIGS. 2A and 2B represent a flowchart of a method of seat belt status detection, that may be performed by the system of FIG. 1, according to an embodiment.
Figure 2B:
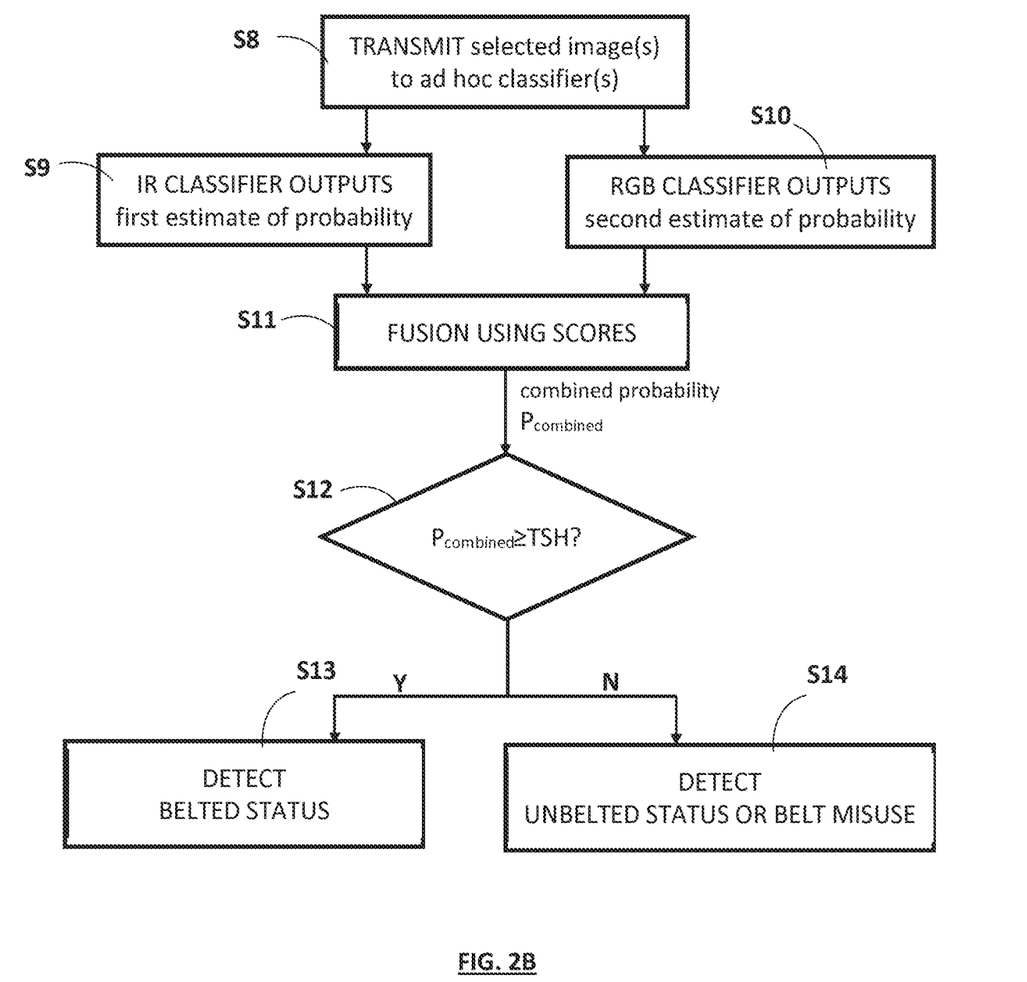

A computer-implemented method for seat belt status detection in a vehicle, executed by the system 100, is illustrated in FIG. 2, and will now be described.

The method includes the execution of the following detection process or algorithm, under control of the processor 310.

At a given point in time, in a step S1, the image capturing device 200 captures one initial IR image IR_$IM_0$ and one initial RGB or color image RGB_$IM_0$ of a same scene in the vehicle, for example a wide-angle view of the two front seats and partially the rear seats.

In a step S2, the two initial IR and RGB images IR_$IM_0$ and RGB_$IM_0$ are transmitted from the image capturing device 200 to the processing device 300.

In a step S3, the body key points module 380 processes each of the initial IR image IR_$IM_0$ and the initial RGB image RGB_$IM_0$, and detects body key points, for example left/right shoulders, hip, hands, etc., for one or more occupants of the vehicle visible in the initial images.

In a step S4, the image generator 370 generates a plurality of sub-images from each initial image IR_$IM_0$ and RGB_$IM_0$, using detected body key points provided by the module 380. The sub-images in the IR or NIR spectrum are termed as "first images" and the sub-images in the RGB or color spectrum are termed as "second images". More precisely, based on the body key points detected in each initial image $IR\_IM_0$, $RGB\_IM_0$, the image generator 370 determines, for each occupant visible in the initial image, one seat belt region corresponding to an area in the image where the seat belt is expected to be visible when it is correctly worn by the occupant in the vehicle. For example, a curved line extending from a shoulder to an opposite hip, along which the seat belt is expected to be located may be determined. In case two occupants are seated in the two front seats of the vehicle and are both visible in each of the IR image $IR\_IM_0$ and the RGB image $RGB\_IM_0$, the module 380 detects body key points for the two front occupants and the generator 370 determines two corresponding seat belt regions in each of the IR image $IR\_IM_0$ and the RGB image $RGB\_IM_0$. Then, the generator 370 generates: a plurality of first IR images or sub-images $IR\_IM_{1i}$ ..., from the initial IR image $IR\_IM_0$, with i=1, 2, ..., corresponding to different parts of each seat belt region respectively, and a plurality of second RGB images or sub-images $RGB\_IM_{2j}$ ..., from the initial RGB image $RGB\_IM_0$, with j=1, 2, ..., corresponding to different parts of each seat belt region.

The sub-images may be located along a line defining the seat belt region, adjacent to each other.

Optionally, the image generator 370 may determine a buckle region, that is expected to include the seat belt buckle assembled with the buckle receiver, in each initial image $IR\_IM_0$ and $RGB\_IM_0$, for each occupant in the image, using the detected body key points. In that case, the image generator may further generate a first IR image, or sub-image, corresponding to the buckle region from the initial IR image $IR\_IM_0$ and a second RGB image, or sub-image, corresponding to the buckle region in the initial RGB image $RGB\_IM_0$.

The first images may be cropped from the initial IR image $IR\_IM_0$, and the second images may be cropped from the initial RGB image $RGB\_IM_0$. For example, the cropped images may be delimited by bounding boxes, for example rectangular, as illustrated in FIG. 5. This allows to limit the processing to relevant parts of the initial images.

The generation of the first IR images, or sub-images, $IR\_IM_{1i}$ and second RGB images, or sub-images, $RGB\_IM_{2j}$ from the initial IR image and from the initial RGB image, respectively, is not limited to using body key points. In another embodiment, the location or orientation of the first IR images, or sub-images, and second RGB images, or sub-images, are based on fixed positions in the initial image, or other parameters that give hint to which location in the image is most informative to extract the seat belt status.

In a variant, the generator 370 could generate one sub-image, or first image, from the initial IR image $IR\_IM_0$ and one sub-image, or second image, from the initial color image $RGB\_IM_0$.

In a step S5, the ranking module 340 performs an image analysis of each of the images generated by the generator 370, including first IR images and second RGB images, to extract information from each of the generated images. Thus, the ranking module 340 may analyze different aspects in each of the generated images, that are relevant for determining whether the content in the analyzed image is likely to help in determining a seat belt status, to attribute a score to the analyzed image. The ranking module 340 may execute one or more tasks of analysis of information in image, such as: a statistical analysis of the properties of the image, such as brightness, contrast, ... ; an occlusion detection to detect if the seat visible is not visible because it is occluded by something; a seat belt color profile recognition, to determine if the seat belt in the image matches a predetermined color profile of the vehicle seat belt; a clothing detection to detect clothing, for example a jacket, occluding a back area in the image.

The tasks of analysis of information in image may be performed by digital image processing means (e.g., a digital image processor).

Then, in a step S6, the ranking module attributes a score to each of the images generated by the generator 370, using the information extracted by image analysis. The extracted information may include the results of the tasks of analysis of information.

In a step S7, the selection module 390 selects images, among all the first IR images $IR\_IM_{1i}$ and second RGB images $RGB\_IM_{2j}$ generated by the generator 370, based on the scores. For example, the images having a score that is higher than a predetermined threshold are selected, or the highest score p IR images are selected, p being a predetermined number. The selection may be configurable. For example, it may be adjusted depending on the available computational resources and/or a computational budget. The less computational resources available, the more important the selection. The selected images may include a mix of one or more first IR images $IR\_IM_{1i}$ and one or more second RGB images $RGB\_IM_{2j}$. In some cases, all the generated images $IR\_IM_{1i}$ and $RGB\_IM_{2j}$ may be selected. It might happen that only one or more first IR images $IR\_IM_{1i}$ are selected, and no RGB second images are selected, or vice versa. The image selection among all the generated sub-images also allows to dynamically determine which location in the initial IR and color images to trust more, in the current situation.

Then, in a step S8, the only selected images are passed to the classifiers 320, 330. More precisely, when the selected images include a mix of one or more first IR images $IR\_IM_{1i}$ and one or more second RGB images $RGB\_IM_{2j}$, the one or more first IR images $IR\_IM_{1i}$ selected are transmitted to the first classifier 320, and the one or more second RGB images $RGB\_IM_{2j}$ selected are transmitted to the second classifier 330.

In a step S9, the first classifier 320 processes each received IR first image and determines a first estimate of probability that the IR first image includes a seat belt that is correctly worn.

In a step S10, the second classifier 330 concomitantly processes each received RGB second image and determines a second estimate of probability that the RGB second image includes a seat belt that is correctly worn.

Then, in a step S11, the fusion module 350 combines the first estimate(s) of probability and the second estimate(s) of probability determined by the two classifiers 320, 330 for the received IR first image(s) and RGB second image(s), using respective scores attributed to the images, each score representing how the corresponding image is trustworthy to detect the seat belt, and determines a combined probability. In an embodiment, the estimates of probability of the different IR or RGB images may be weighted using the respective scores of the images. For example, the combined probability is computed using the following expression:

$$p_{combined} = \frac{\sum_{i=0}^{i=n-1} \alpha_i \cdot p_i}{\sum_{i=0}^{i=n-1} \alpha_i}$$

where $p_{combined}$ is the combined probability $\alpha_i$ is the score attributed to an image of index i $p_i$ is the estimate of probability of the image of index i, determined by the corresponding classifier.

Alternatively, or additionally, the fusion module 350 could use predefined rules for combining the estimates of probability of the at least one first image and the at least one second image. For example, the predefined rules may be based on an experimental and/or statistical knowledge about which combination of sub-images are more trustworthy than others, in other words better at detecting the seat belt status.

Then, in a step S12, the combined probability is compared, by the detection module 360, to a predetermined detection threshold to determine a seat belt status detection result. If the combined probability is higher than the detection threshold, see branch "Y" in FIG. 2B, it is detected that the seat belt is correctly worn and the seat belt status is belted, in a step S13. If the combined probability if less than the threshold, see branch "N" in FIG. 2B, it is detected that the seat belt is not correctly worn, and the seat belt status is either not belted or misused, in a step S14.

The detection threshold may be configurable. For example, it may be adjusted depending on a level of reliability desired for the detection. The more the detection reliable, the higher the detection threshold.

The process described above, including the steps S1 to S12, may be repeated at successive points in time, for example iteratively or cyclically.

In that case, the result or output of the combining step S11 may be stabilized by a feed-back loop where the scores of the IR first images and of the RGB second images and the outputs of the two classifiers 320, 330 are provided as inputs for the next execution of the process.

The step S4 of generating sub-images from each initial image, in IR and visible light, is optional. The step S7 of image selection is also optional.

In an embodiment, the selection of sub-images in an initial image is not based on the image scores, but on positions of the sub-images in the initial images, the positions of the selected images changing at each cycle or for each new pair of initial images. A purpose of such a sub-image selection is to reduce the computational resources needed for the seat belt status detection.

Let's consider the following illustrative and non-limitative example described below:

The step S1 is performed iteratively or cyclically, so that the capturing device 200 captures a sequence of pairs of initial images including an IR image and a color image, at successive points in time $t_0, t_1, t_2, \ldots$ : $\{IR\_IM_0(t_0), RGB\_IM_0(t_0)\}$, $\{IR\_IM_0(t_1), RGB\_IM_0(t_1)\}$, $\{IR\_IM_0(t_2), RGB\_IM_0(t_2)\}$, $\{IR\_IM_0(t_3), RGB\_IM_0(t_3)\}$, $\{IR\_IM_0(t_4), RGB\_IM_0(t_4)\}, \ldots$ At each cycle, after the step S1, the steps S2 to S6 are performed as previously described. In the step S4, N first images or sub-images are generated from the initial IR image and N second images or sub-images are generated from the initial color image. The N first/second images correspond to N different sub-image positions $pos_1, \ldots, pos_N$. For example, N=4 as illustrated in FIG. 5 for an initial color image.

After the step S6, a selection step S7 is performed. In the selection step S7, M first images from the N first images and M second images from the N second images, with M<N, are selected. For example, M=2. And the sub-image positions of the selected images change at each cycle, for example, by a one-position shift. All the sub-image positions may be selected after a few cycles. For example, the selection is as follows:

at $t_0$: selection of the sub-images at positions $pos_1, pos_2$;
at $t_1$: selection of the sub-images at positions $pos_2, pos_3$;
at $t_2$: selection of the sub-images at positions $pos_3, pos_4$;
at $t_3$: selection of the sub-images at positions $pos_4, pos_1$;
at $t_4$: selection of the sub-images at positions $pos_1, pos_2$;
at $t_5$: selection of the sub-images at positions $pos_2, pos_3$;
and so on . . . .

The present disclosure also concerns: a computer program or to an instruction code corresponding to a software program that includes instructions to cause the seat belt status detection system 100 to execute the steps of the method previously disclosed; a computer-readable medium having stored thereon the above computer program; a vehicle including the seat belt status detection system 100.

As previously described, the seat belt status detection uses one or more first images in the infrared spectrum and one or more second images in the visible light spectrum, that are respectively transmitted to a first classifier, dedicated for images in the infrared spectrum, and to a second classifier, that is dedicated for images in the visible light. More generally, the seat belt status detection may use one or more first images in a first spectrum and one or more second images in second spectrum, different from the first spectrum, that are respectively transmitted to a first classifier dedicated for images in the first spectrum and a second classifier dedicated for images in the second spectrum. The first spectrum and the second spectrum are two different parts of the electromagnetic spectrum, preferably two separate parts of the electromagnetic spectrum.

Although implementations for techniques and apparatuses for seat belt status detection in a vehicle have been described in language specific to certain features and/or methods, the subject of the appended claims is not necessarily limited to the specific features or methods described. Rather, the specific features and methods are disclosed as example implementations for techniques and apparatuses for seat belt status detection.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A method comprising:
    obtaining at least one first image in the infrared spectrum of at least part of a seat belt region where a seat belt is expected to be visible when it is worn by a person in a vehicle;
    obtaining at least one second image in the visible light spectrum of at least part of the seat belt region used to obtain the at least one first image;

performing image analysis to extract information from each of the at least one first image and the at least one second image;

attributing a score to each of the at least one first image and the at least one second image based on the information extracted from the at least one first image and the at least one second image, respectively, and based on a predefined rule, each score being indicative of trustworthiness of the corresponding image to detect a seat belt status;

transmitting the at least one first image to a first classifier, dedicated for images in the infrared spectrum;

transmitting the at least one second image to a second classifier, dedicated for images in the visible light spectrum;

determining from the first classifier a first estimate of probability that the at least one first image includes the seat belt being correctly worn;

determining from the second classifier a second estimate of probability that the at least one second image includes the seat belt being correctly worn;

combining the first estimate of probability and the second estimate of probability, based on the scores attributed to each of the at least one first image and to the at least one second image, to determine a combined probability; and comparing the combined probability to a predetermined threshold to determine the seat belt status;

wherein obtaining the at least one first image further comprises:
  obtaining the at least one first image from a first image capturing device, the first image capturing device configured for capturing the at least one first image in the infrared spectrum inside the vehicle;

wherein obtaining the at least one second image further comprises:
  obtaining the at least one second image from a second image capturing device, the second image capturing device configured for capturing the at least one second image in the visible light spectrum inside the vehicle; and wherein the method further comprises:
  generating, from the at least one first image, a plurality of first images of different parts of the seat belt region respectively; and
  generating, from the at least one second image, a plurality of second images of different parts of the seat belt region respectively;

wherein the operation of obtaining the at least one first image further comprises:
  selecting one or more of the plurality of first images;

wherein the operation of obtaining the at least one second image further comprises selecting one or more of the plurality of second images; and wherein only the selected first and second images are transmitted to the first and second classifiers, respectively.

2. The method according to claim 1, wherein performing the image analysis comprises, for each image, at least one of the following image analysis tasks:
  analysis of statistical properties of the image;
  detection of an occlusion to detect that vision of the seat belt is occluded in the image;
  seat belt color profile recognition to recognize a predetermined profile of a seat belt color in the image; or
  clothing detection to detect clothing occluding a back area in the image.

3. The method of claim 2, wherein the image analysis tasks are performed by a digital image processor.

4. The method according to claim 1, wherein the selecting of the one or more of the plurality of first images and the selecting of the one or more of the plurality of second images is performed based on the scores attributed to the plurality of first images and the plurality of second images, respectively.

5. The method according to claim 1, further comprising:
  detecting body key points for one or more occupants of the vehicle visible in each of the plurality of first images and the plurality of second images; and
  determining the seat belt region, based on the detected body key points, in each of the plurality of first images and the plurality of second images.

6. The method according to claim 1, wherein the operations of obtaining the at least one first image and obtaining the at least one second image are repeated cyclically, and, at each cycle, N first images are generated from the at least one first image, N second images are generated from the at least one second image, and M first images from the N first images and M second images from the N second images are selected, with M<N, and wherein image positions of the selected images change at each cycle.

7. The method according to claim 6, wherein a result of the combining operation is stabilized by a feed-back loop where the scores of the at least one first image and of the at least one second image and the outputs of the first and second classifiers are provided as inputs for the next execution of the cycle.

8. The method according to claim 1, wherein, in the operation of combining, the first estimate of probability of the at least one first image and the second estimate of probability of the at least one second image are weighted using the scores respectively attributed to the at least one first image and to the at least one second image to compute the combined probability.

9. The method according to claim 1, wherein the operation of combining uses predefined rules for combining the estimates of probability of the at least one first image and the at least one second image.

10. The method of claim 1, wherein at least one of:
  obtaining the at least one first image comprises:
    obtaining the at least one first image from a first image capturing device;
  obtaining the at least one second image comprises:
    obtaining the at least one second image from a second image capture device; or
  obtaining the at least one first image comprises obtaining the at least one first image from a first image capturing device and obtaining the at least one second image comprises obtaining the at least one second image from the first image capturing device.

11. A system for a vehicle, comprising:
  an image capturing device; and
  a processing device operable to:
    obtain, from the image capturing device, at least one first image in the infrared spectrum of at least part of a seat belt region where a seat belt is expected to be visible when it is worn by a person in the vehicle;
    obtain, from the image capturing device, at least one second image in the visible light spectrum of at least part of the seat belt region used to obtain the at least one first image;
    perform image analysis to extract information from each of the at least one first image and the at least one second image;

attribute a score to each of the at least one first image and the at least one second image based on the information extracted from the at least one first image and the at least one second image, respectively, and based on a predefined rule, each score being indicative of trustworthiness of the corresponding image to detect a seat belt status;

transmit the at least one first image to a first classifier, dedicated for images in the infrared spectrum;

transmit the at least one second image to a second classifier, dedicated for images in the visible light spectrum, determine from the first classifier a first estimate of probability that the at least one first image includes the seat being belt correctly worn;

determine from the second classifier a second estimate of probability that the at least one second image includes the seat belt being correctly worn;

combine the first estimate of probability and the second estimate of probability, based on the scores attributed to each of the at least one first image and to the at least one second image, to determine a combined probability; and compare the combined probability to a predetermined threshold to determine the seat belt status;

wherein the processing device is operable to obtain the at least one first image by:

obtaining the at least one first image from a first image capturing device, the first image capturing device configured to capture the at least one first image in the infrared spectrum inside the vehicle;

wherein the processing device is operable to obtain the at least one second image by:

obtaining the at least one second image from a second image capturing device, the second image capturing device configured to capture the at least one second image in the visible light spectrum inside the vehicle; and wherein the processing device is further operable to:

generate, from the at least one first image, a plurality of first images of different parts of the seat belt region respectively; and generate, from the at least one second image, a plurality of second images of different parts of the seat belt region respectively;

wherein the processing device is operable to obtain the at least one first image by selecting one or more of the plurality of first images;

wherein the processing device is operable to obtain the at least one second image by selecting one or more of the plurality of second images; and wherein only the selected first and second images are transmitted to the first and second classifiers, respectively.

12. The system of claim 11, further comprising the vehicle.

13. The system of claim 11, wherein the processing device is operable to perform the image analysis by performing at least one of the following image analysis tasks:

analysis of statistical properties of the image;

detection of an occlusion to detect that vision of the seat belt is occluded in the image;

seat belt color profile recognition to recognize a predetermined profile of the seat belt color in the image; or clothing detection to detect clothing occluding a back area in the image.

14. The system of claim 13, further comprising:

a digital image processor, wherein the digital image processor performs the image analysis tasks.

15. An apparatus comprising:

a processor; and a computer-readable medium storing instructions that, responsive to execution by the processor, cause the processor to execute operations comprising:

obtain, from an image capturing device, at least one first image in the infrared spectrum of at least part of a seat belt region where a seat belt is expected to be visible when it is worn by a person in the vehicle;

obtain, from the image capturing device, at least one second image in the visible light spectrum of at least part of the seat belt region used to obtain the at least one first image;

perform image analysis to extract information from each of the at least one first image and the at least one second image;

attribute a score to each of the at least one first image and the at least one second image based on the information extracted from the at least one first image and the at least one second image, respectively, and based on a predefined rule, each score being indicative of trustworthiness of the corresponding image to detect a seat belt status;

transmit the at least one first image to a first classifier, dedicated for images in the infrared spectrum;

transmit the at least one second image to a second classifier, dedicated for images in the visible light spectrum, determine from the first classifier a first estimate of probability that the at least one first image includes the seat belt correctly worn;

determine from the second classifier a second estimate of probability that the at least one second image includes the seat belt correctly worn;

combine the first estimate of probability and the second estimate of probability, based on the scores attributed to each of the at least one first image and to the at least one second image, to determine a combined probability; and compare the combined probability to a predetermined threshold to determine the seat belt status;

wherein the instructions, responsive to execution by the processor, further cause the processor to obtain the at least one first image by:

obtaining the at least one first image from a first image capturing device, the first image capturing device configured to capture the at least one first image in the infrared spectrum inside the vehicle;

wherein the instructions, responsive to execution by the processor, further cause the processor to obtain the at least one second image by:

obtaining the at least one second image from a second image capturing device, the second image capturing device configured to capture the at least one second image in the visible light spectrum inside the vehicle; and wherein the processing device is further operable to:

generate, from the at least one first image, a plurality of first images of different parts of the seat belt region respectively; and generate, from the at least one second image, a plurality of second images of different parts of the seat belt region respectively;

wherein the instructions, responsive to execution by the processor, further cause the processor to obtain the at least one first image by selecting one or more of the plurality of first images;

wherein the instructions, responsive to execution by the processor, further cause the processor to obtain the at least one second image by selecting one or more of the plurality of second images; and wherein only the selected first and second images are transmitted to the first and second classifiers, respectively.

\* \* \* \* \*